United States Patent
Feng et al.

(10) Patent No.: US 11,652,366 B2
(45) Date of Patent: May 16, 2023

(54) INTEGRATED DEVICE WITH CHARGING AND WIRELESS NETWORK FUNCTIONS

(71) Applicant: LUXSHARE PRECISION INDUSTRY CO., LTD., Shenzhen (CN)

(72) Inventors: Yun Feng, Shenzhen (CN); Min Fan, Shenzhen (CN); Wenjun Tang, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 8 days.

(21) Appl. No.: 17/515,856

(22) Filed: Nov. 1, 2021

(65) Prior Publication Data
US 2022/0294265 A1    Sep. 15, 2022

(30) Foreign Application Priority Data
Mar. 11, 2021    (CN) .......................... 202120512696.1

(51) Int. Cl.
| | |
|---|---|
| *H02J 50/00* | (2016.01) |
| *H02J 7/00* | (2006.01) |
| *H01R 13/62* | (2006.01) |
| *H01R 13/66* | (2006.01) |

(52) U.S. Cl.
CPC ........ *H02J 50/005* (2020.01); *H01R 13/6205* (2013.01); *H01R 13/6675* (2013.01); *H02J 7/0045* (2013.01); *H02J 2207/30* (2020.01)

(58) Field of Classification Search
CPC .... H02J 50/005; H02J 7/0045; H02J 2207/30; H01R 13/6205; H01R 13/6675
See application file for complete search history.

(56) References Cited

U.S. PATENT DOCUMENTS

2014/0035387 A1* 2/2014 Baarman ............... H02J 7/0042
                                                              307/104
2017/0162985 A1* 6/2017 Randall ................. H02J 7/0045

FOREIGN PATENT DOCUMENTS

| CN | 202817799 U | 3/2013 |
|---|---|---|
| CN | 203522265 U | 4/2014 |
| CN | 110856278 A | 2/2020 |
| CN | 306620306 S | 6/2021 |

\* cited by examiner

*Primary Examiner* — Carlos Amaya
(74) *Attorney, Agent, or Firm* — Birch, Stewart, Kolasch & Birch, LLP

(57) ABSTRACT

An integrated device includes a power adapter and a wireless module. The power adapter includes a charging plug and a first connector. The wireless module includes a second connector mateable with the first connector. Each of the power adapter and the wireless module is an independent device. In addition, the power adapter and the wireless module can be detachably combined together through the first connector and the second connector. With this arrangement, when the power adapter and the wireless module are used separately, their respective functions can be achieved. When the power adapter and the wireless module are used in combination, the wireless module can be powered by the power adapter, thereby improving the convenience of using the integrated device.

20 Claims, 14 Drawing Sheets

INTEGRATED DEVICE WITH CHARGING AND WIRELESS NETWORK FUNCTIONS

CROSS-REFERENCE TO RELATED APPLICATION

This patent application claims priority of a Chinese Patent Application No. 202120512696.1, filed on Mar. 11, 2021 and titled "INTEGRATED DEVICE", the entire content of which is incorporated herein by reference.

TECHNICAL FIELD

The present disclosure relates to an integrated device, which belongs to a technical field of electronic devices.

BACKGROUND

With the development of electronic products, people have put forward higher and higher requirements on how to charge electronic products and how to obtain wireless networks. In general, the electronic products can be charged through a power adapter, and a wireless module can provide wireless networks for the electronic products. However, the power adapter and wireless module in the prior art are generally independent devices. Users need to purchase two devices separately, which are not easy to carry when traveling and need to occupy two input/output ports of a mobile terminal device.

How to combine the power adapter and the wireless module is a problem that needs to be solved by those skilled in the art.

SUMMARY

An object of the present disclosure is to provide an integrated device with charging and wireless network functions.

In order to achieve the above object, the present disclosure adopts the following technical solution: an integrated device, including: a power adapter, the power adapter including a charging plug and a first connector; and a wireless module, the wireless module including a second connector mateable with the first connector; wherein each of the power adapter and the wireless module is an independent device, and the power adapter and the wireless module can be detachably combined together through the first connector and the second connector; and wherein when the power adapter and the wireless module are combined together through the first connector and the second connector, the charging plug is capable of suppling power to the wireless module through the first connector and the second connector.

Compared with the prior art, the power adapter and the wireless module of the present disclosure are independent devices. Besides, the power adapter and the wireless module can be detachably combined together through the first connector and the second connector. When the power adapter and the wireless module are combined together through the first connector and the second connector, the charging plug can supply power to the wireless module through the first connector and the second connector. With this configuration, when the power adapter and the wireless module are used separately, they can achieve their respective functions. In addition, when the power adapter and the wireless module are used in combination, the wireless module can be powered through the power adapter, which improves the convenience of use.

DETAILED DESCRIPTION

Figure 1:
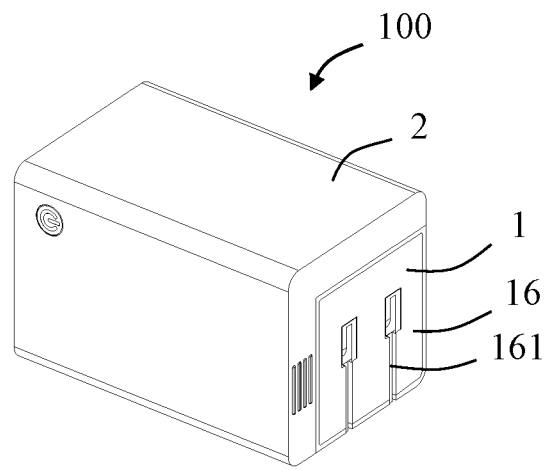
FIG. 1 is a perspective schematic view of an integrated device in accordance with a first embodiment of the present disclosure when a charging plug is folded.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 12, in a first embodiment of the disclosure, an integrated device 100 is disclosed. The integrated device 100 is a two-in-one integrated device which includes a power adapter 1 and a wireless module 2.

The power adapter 1 has a cuboid shape and includes a first side wall 11, a second side wall 12, a third side wall 13, a fourth side wall 14, a first end wall 15 and a second end wall 16. The first side wall 11 and the third side wall 13 are oppositely arranged and parallel to each other. The second side wall 12 and the fourth side wall 14 are oppositely arranged and parallel to each other. The first end wall 15 and the second end wall 16 are oppositely arranged and parallel to each other. The second side wall 12 is perpendicular to the first side wall 11. The first end wall 15 is perpendicular to the first side wall 11 and the second side wall 12.

The first side wall 11 includes a first connector 111. In the illustrated embodiment of the present disclosure, the first connector 111 is a receptacle connector, such as a USB Type C receptacle connector.

The first end wall 15 includes a power output port 151. The power adapter 1 can charge an electronic device (for example, a mobile terminal device) through the power output port 151. In the illustrated embodiment of the present disclosure, the power output port 151 is a port of the USB Type C receptacle connector.

Figure 2:
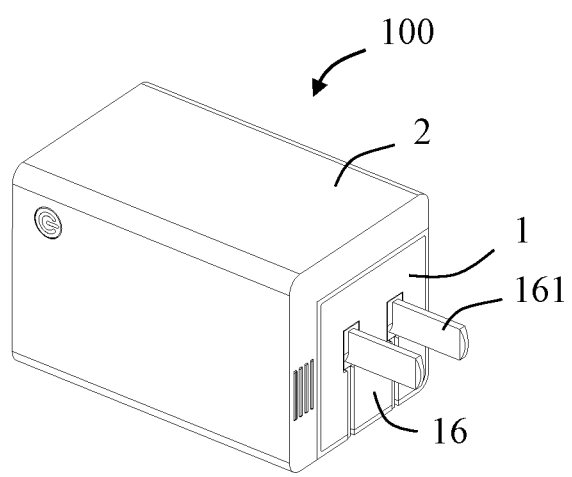
FIG. 2 is a perspective schematic view of the integrated device in FIG. 1 when the charging plug is opened.
Figure 3:
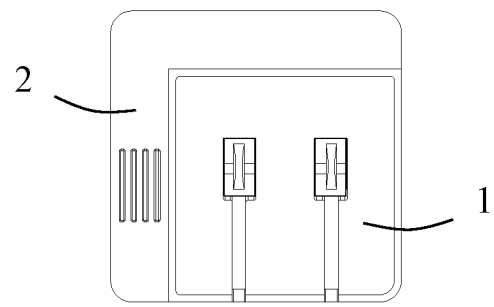
FIG. 3 is a front view of FIG. 2.
Figure 4:
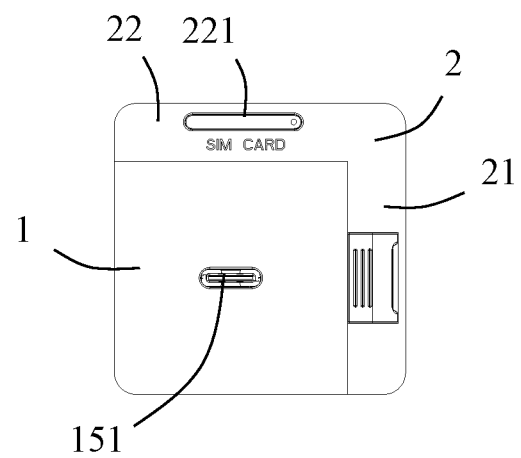
FIG. 4 is a rear view of FIG. 2.
Figure 5:
FIG. 5 is a left side view of FIG. 2.
Figure 6:
FIG. 6 is a right side view of FIG. 2.
Figure 7:
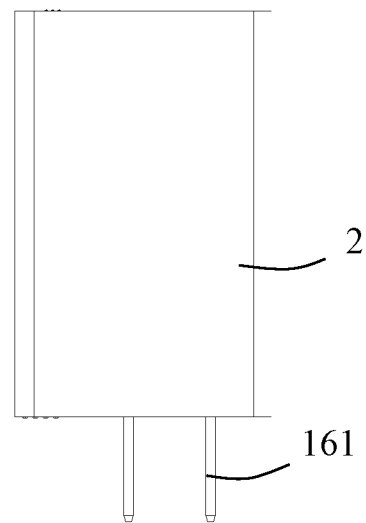
FIG. 7 is a top view of FIG. 2.
Figure 8:
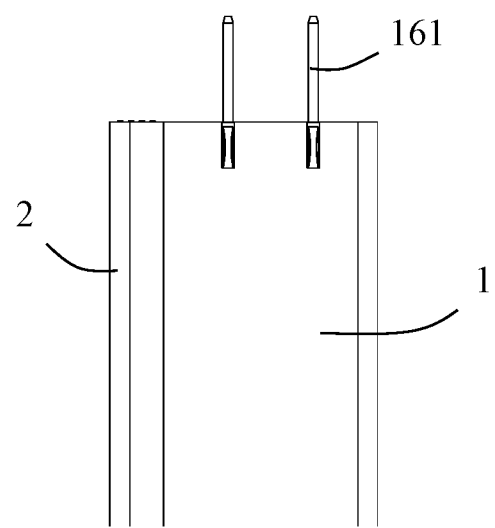
FIG. 8 is a bottom view of FIG. 2.
Figure 9:
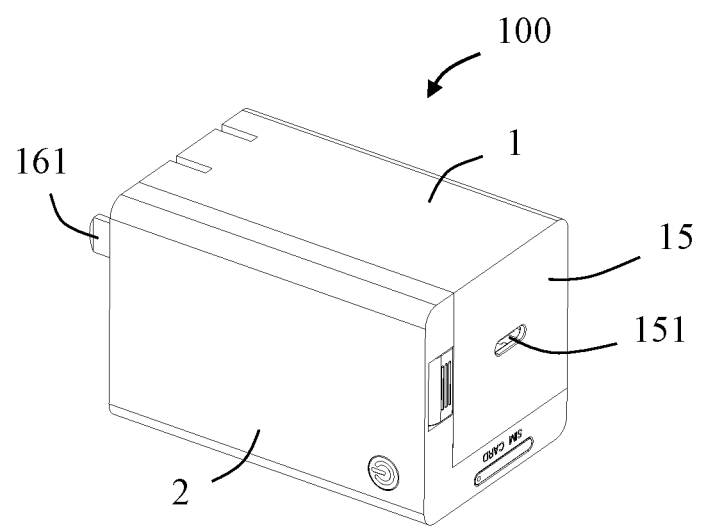
FIG. 9 is a perspective schematic view from another angle of FIG. 2.
Figure 10:
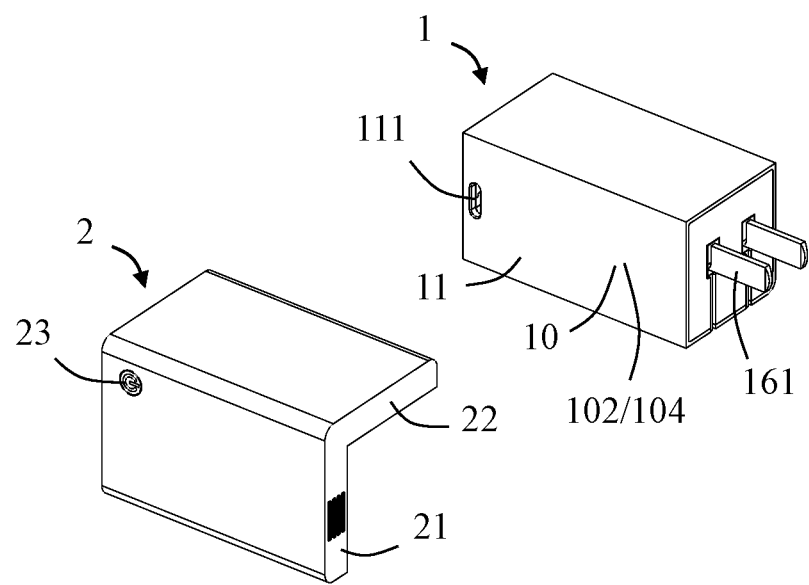
FIG. 10 is a perspective exploded view of FIG. 2.
Figure 11:
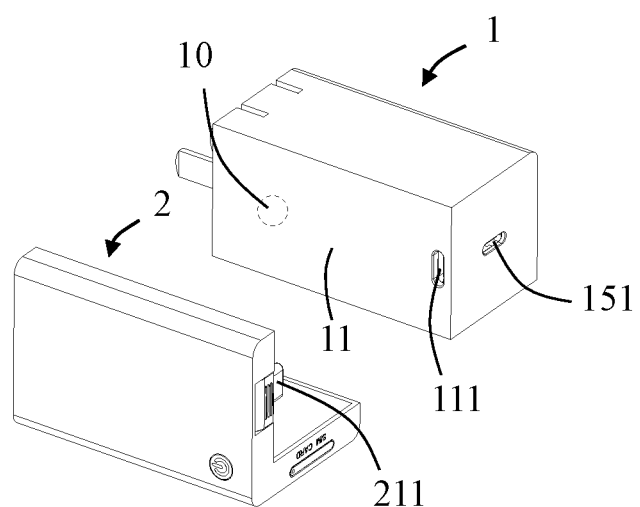
FIG. 11 is a perspective exploded view of FIG. 10 from another angle.
Figure 12:
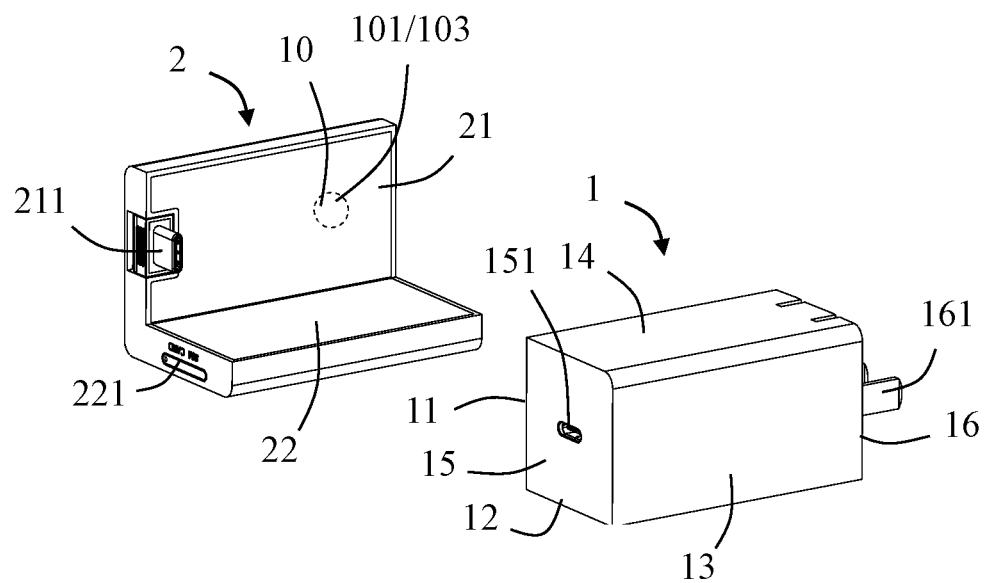
FIG. 12 is a perspective exploded view of FIG. 11 from another angle.

The power adapter 1 includes a charging plug 161 rotatably mounted to the second end wall 16. Referring to FIGS. 1 and 2, the charging plug 161 can be switched between a folded position (for example, a position as shown FIG. 1) and an open position (for example, a position as shown in FIG. 2). When the power adapter 1 is not in use, the charging plug 161 can be folded so as to reduce the space occupied by the charging plug 161 and facilitate carrying. When the power adapter 1 needs to be used, the charging plug 161 is opened to facilitate insertion into a power socket. It is understandable to those skilled in the art that the charging plug 161 may also include other settings. For example, the charging plug 161 can be detachably mounted to the power adapter 1, which is not limited in the present disclosure.

Referring to FIGS. 9 to 12, in the first embodiment, the wireless module 2 is substantially L-shaped, and includes a first wall 21 and a second wall 22 perpendicular to the first wall 21. The wireless module 2 also includes a second connector 211 rotatably mounted to the first wall 21. In the illustrated embodiment of the present disclosure, the second connector 211 is a plug connector, such as a USB Type C plug connector. The second connector 211 can be inserted into the first connector 111 so as to combine the power adapter 1 and the wireless module 2. The second wall 22 further defines a card slot 221 for insertion of an electronic card (for example, a SIM card). In addition, the wireless module 2 also includes a switch button 23. In the illustrated embodiment of the present disclosure, the wireless module 2 is a 5G/WiFi6 module.

The power adapter 1 and the wireless module 2 are independent devices. In addition, the power adapter 1 and the wireless module 2 can be detachably combined together through the first connector 111 and the second connector 211.

When the power adapter 1 and the wireless module 2 are used independently, the charging plug 161 of the power adapter 1 is opened and inserted into a power socket. By connecting the power output port 151 with a mobile terminal device, the mobile terminal device can be charged. When the second connector 211 of the wireless module 2 is opened (referring to FIG. 13), the second connector 211 is connected to a power source, the switch button 23 is turned on, and the wireless module 2 can generate a wireless network.

When the power adapter 1 and the wireless module 2 are combined together through the first connector 111 and the second connector 211, the first wall portion 21 abuts against the first side wall 11, and the second wall portion 22 abuts against the second side wall 12. At this time, the charging plug 161 can supply power to the wireless module 2 through the first connector 111 and the second connector 211, so that the wireless module 2 can work. At the same time, by connecting the power output port 151 to the mobile terminal device, the mobile terminal device can also be charged.

In addition, when the power adapter 1 and the wireless module 2 are combined, the power adapter 1 and the wireless module 2 are fixed by a coupling component. In an embodiment of the present disclosure, the coupling component is a magnetic coupling component 10. The magnetic coupling component 10 includes a magnet 101 and an iron block 102. One of the magnet 101 and the iron block 102 is provided on the power adapter 1 (for example, the first side wall 11 and/or the second side wall 12). The other of the magnet 101 and the iron block 102 is provided on the wireless module 2 (for example, the first wall 21 and/or the second wall 22). Alternatively, the magnetic coupling component 10 includes a first magnet 103 and a second magnet 104 which are magnetically attracted. One of the first magnet 103 and the second magnet 104 is provided on the power adapter 1 (for example, the first side wall 11 and/or the second side wall 12). The other of the first magnet 103 and the second magnet 104 is provided on the wireless module 2 (for example, the first wall 21 and/or the second wall 22). The power adapter 1 and the wireless module 2 are fixed by the magnetic coupling component 10, so that the integrated device 100 is more concise, and easy to assemble and disassemble. Of course, in other embodiments of the present disclosure, the coupling component may also be a buckle component, such as a buckle arm and a buckle surface on which the buckle arm is locked.

Referring to FIGS. 14 to 24, another integrated device 100 is disclosed in a second embodiment of the present disclosure. The integrated device 100 is a three-in-one integrated device which includes a power adapter 1, a wireless module 2 and a power supply module 3. In an embodiment of the present disclosure, the power supply module 3 is a rechargeable battery.

The main differences between the power adapter 1 in the second embodiment and the power adapter 1 in the first embodiment are that: in the second embodiment, the power adapter 1 further includes a third connector 131, and the third connector 131 is provided on the third side wall 13. In the second embodiment of the present disclosure, the third connector 131 is a receptacle connector, such as a USB Type C receptacle connector. The power supply module 3 includes a fourth connector 31 mateable with the third connector 131. The fourth connector 31 is rotatably mounted to the power supply module 3. The power supply module 3 also includes a power indicator 32.

The power supply module 3 is an independent device. In addition, the power adapter 1 and the power supply module 3 can be detachably combined together through the third connector 131 and the fourth connector 31. When the power adapter 1 and the power supply module 3 are combined together through the third connector 131 and the fourth connector 31, the charging plug 161 can charge the power supply module 3 through the third connector 131 and the fourth connector 31.

Figure 13:
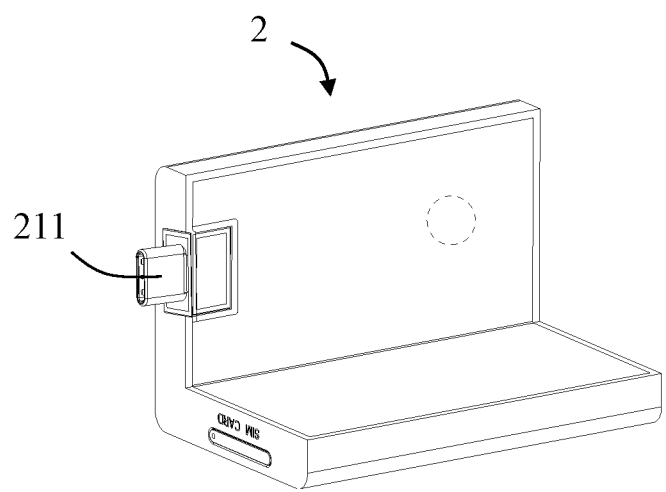
FIG. 13 is a perspective schematic view of a wireless module in FIG. 12, when a second connector is rotated to an open position.
Figure 14:
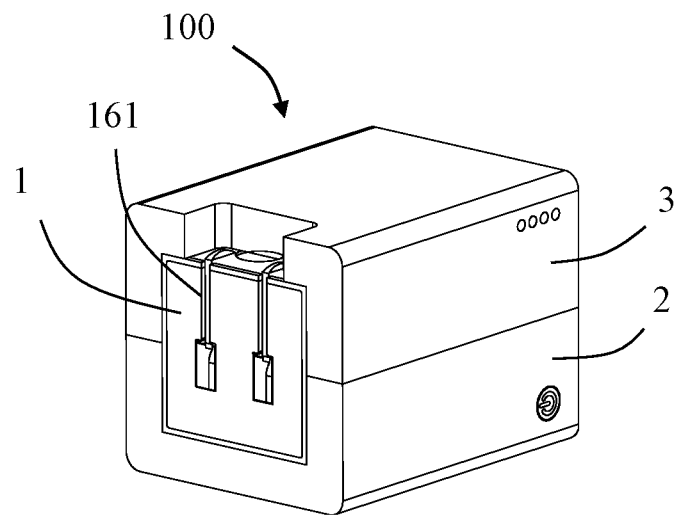
FIG. 14 is a perspective schematic view of the integrated device in accordance with a second embodiment of the present disclosure when the charging plug is folded.
Figure 15:
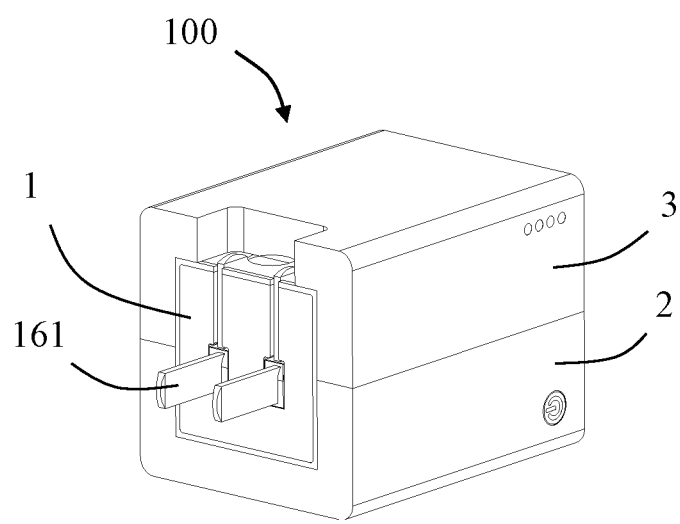
FIG. 15 is a perspective schematic view of the integrated device in FIG. 14, when the charging plug is opened.
Figure 16:
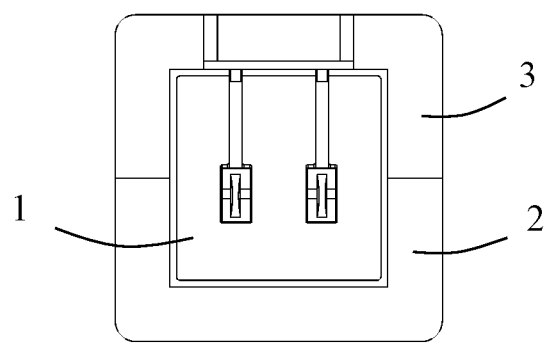
FIG. 16 is a front view of FIG. 15.
Figure 17:
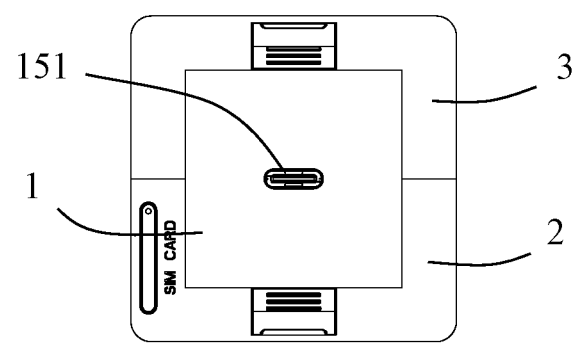
FIG. 17 is a rear view of FIG. 15.
Figure 18:
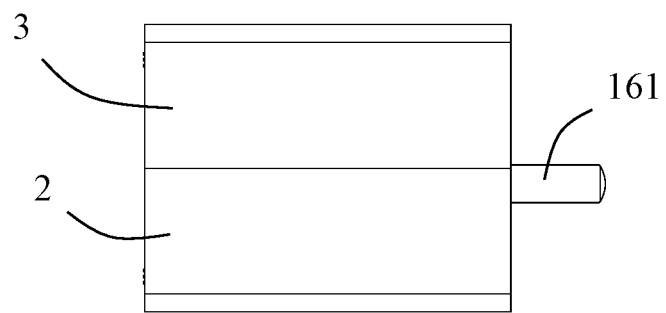
FIG. 18 is a left side view of FIG. 15.
Figure 19:
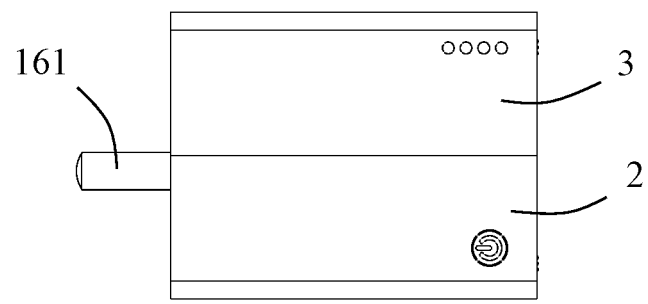
FIG. 19 is a right side view of FIG. 15.
Figure 20:
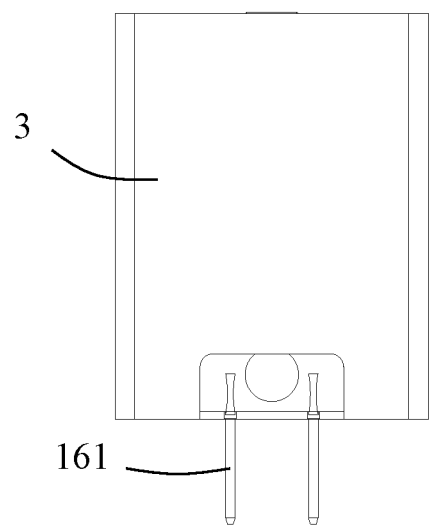
FIG. 20 is a top view of FIG. 15.
Figure 21:
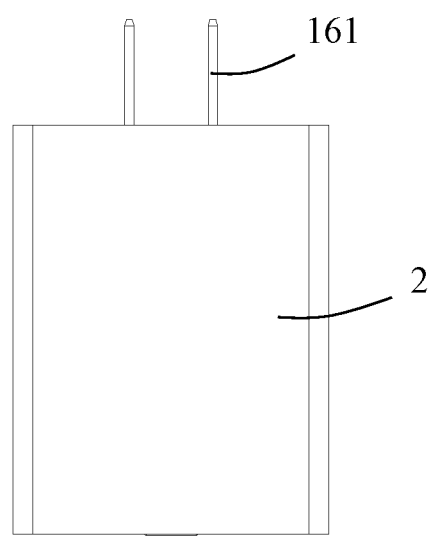
FIG. 21 is a bottom view of FIG. 15.
Figure 22:
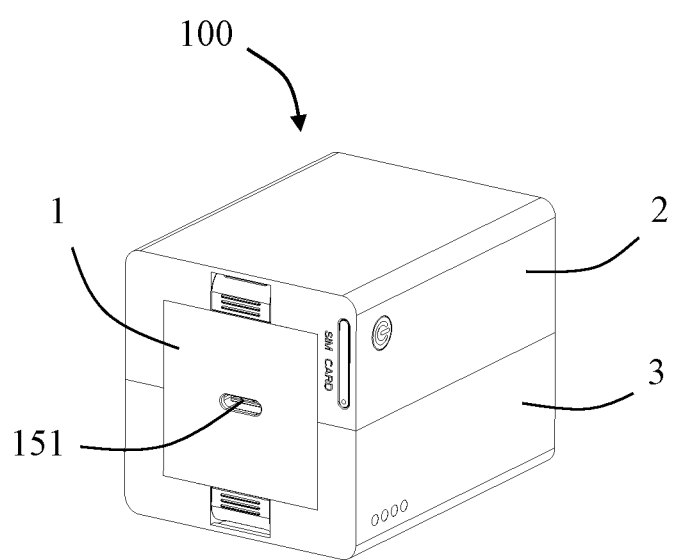
FIG. 22 is a perspective schematic view of FIG. 15 from another angle.
Figure 23:
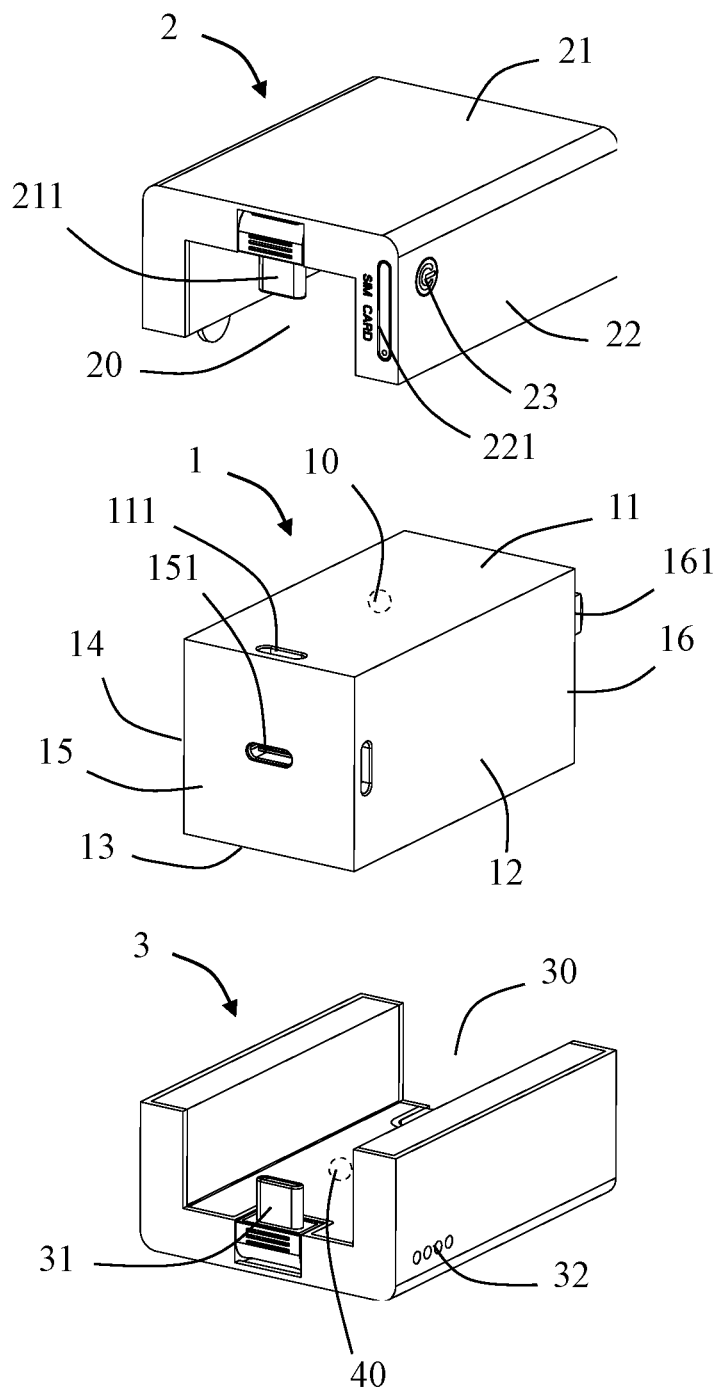
FIG. 23 is a perspective exploded view of FIG. 22.
Figure 24:
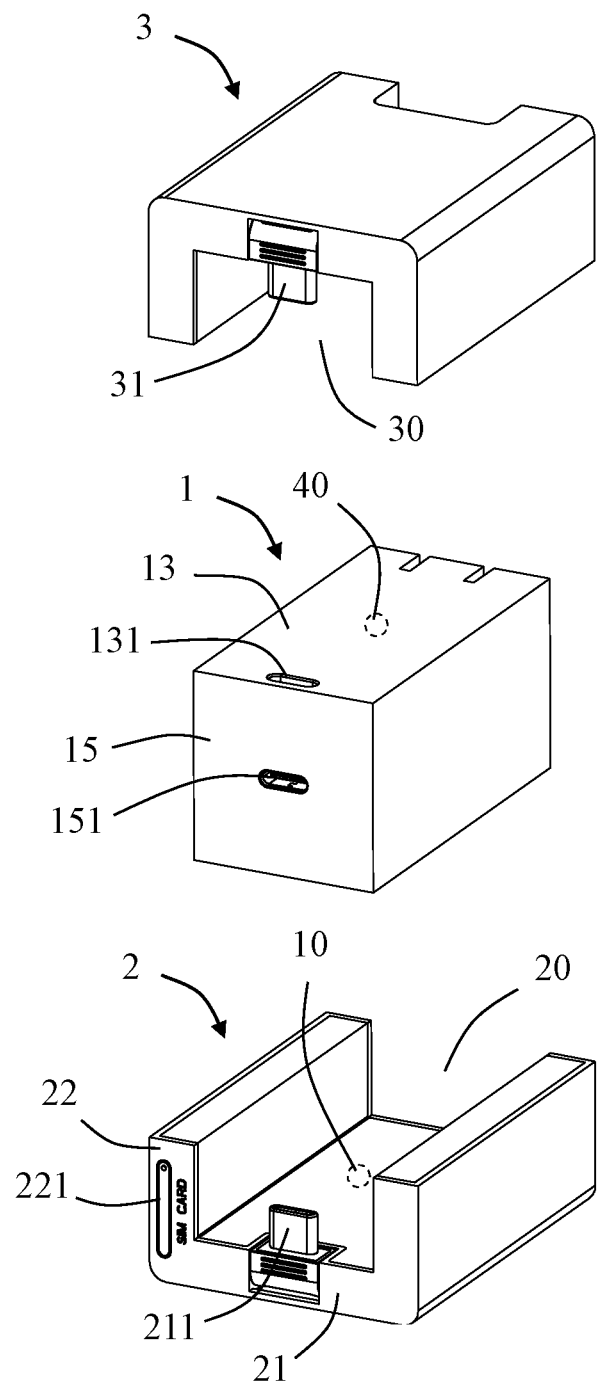
FIG. 24 is an exploded perspective view of FIG. 23 from another angle.

When the power adapter 1, the wireless module 2 and the power supply module 3 are used independently, the charging plug 161 of the power adapter 1 is opened and inserted into a power socket. By connecting the power output port 151 with a mobile terminal device, the mobile terminal device can be charged. When the second connector 211 of the wireless module 2 is opened (referring to FIG. 13), the second connector 211 is connected to a power source, the switch button 23 is turned on, and the wireless module 2 can generate a wireless network. When the fourth connector 31 of the power supply module 3 is opened (refer to the opening method of the second connector 211 as shown in FIG. 13), by connecting the fourth connector 31 to the mobile terminal device, the mobile terminal device can be charged.

When the power adapter 1, the wireless module 2 and the power supply module 3 are combined together, the power adapter 1 is clamped between the wireless module 2 and the power supply module 3. Specifically, the wireless module 2 and the power supply module 3 are both U-shaped. The wireless module 2 has a first receiving space 20. The power supply module 3 has a second receiving space 30. The power adapter 1 is jointly received in the first receiving space 20 and the second receiving space 30.

The power adapter 1 and the power supply module 3 are fixed by another magnetic coupling component 40. The other magnetic coupling component 40 is similar to the magnetic coupling component 10, which will not be repeated here.

Compared with the prior art, the integrated device 100 of the present disclosure can achieve respective functions when the power adapter 1, the wireless module 2 and the power supply module 3 are used separately. In addition, when the power adapter 1, the wireless module 2 and the power supply module 3 are used in combination, the wireless module 2 can be powered through the power adapter 1 or the power supply module 3, thereby improving the convenience of using the integrated device 100.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An integrated device, comprising:
   a power adapter, the power adapter comprising a charging plug and a first connector; and
   a wireless module, the wireless module comprising a second connector mateable with the first connector;
   wherein each of the power adapter and the wireless module is an independent device, and the power adapter and the wireless module can be detachably combined together through the first connector and the second connector;
   wherein when the power adapter and the wireless module are combined together through the first connector and the second connector, the charging plug is capable of supplying power to the wireless module through the first connector and the second connector; and
   wherein the wireless module comprises a first wall and a second wall perpendicular to the first wall, the second connector is provided on the first wall, and the second wall further defines a card slot for insertion of an electronic card.

2. The integrated device according to claim 1, wherein the power adapter and the wireless module are fixed by a coupling component.

3. The integrated device according to claim 2, wherein the coupling component is a magnetic coupling component, the magnetic coupling component comprises a magnet and an iron block; and wherein one of the magnet and the iron block is provided on the power adapter, and the other of the magnet and the iron block is provided on the wireless module.

4. The integrated device according to claim 2, wherein the coupling component is a magnetic coupling component, the magnetic coupling component comprises a first magnet and a second magnet which are magnetically attracted; and wherein one of the first magnet and the second magnet is provided on the power adapter, and the other of the first magnet and the second magnet is provided on the wireless module.

5. The integrated device according to claim 1, wherein the first connector is a receptacle connector, and the second connector is a plug connector; and wherein the second connector is rotatably mounted to the wireless module, and the charging plug is rotatably mounted to the power adapter.

6. The integrated device according to claim 5, wherein the power adapter further comprises a power output port, and the power adapter is capable of charging an electronic device through the power output port.

7. The integrated device according to claim 6, wherein the power adapter has a cuboid shape, the power adapter comprises a first side wall, a second side wall perpendicular to the first side wall, and a first end wall perpendicular to the first side wall and the second side wall; and wherein the first connector is provided on the first side wall, and the power output port is provided on the first end wall.

8. The integrated device according to claim 1, wherein when the power adapter and the wireless module are combined together, the first wall portion abuts against the first side wall, and the second wall portion abuts against the second side wall.

9. An integrated device, comprising:
   a power adapter, the power adapter comprising a charging plug and a first connector; and
   a wireless module, the wireless module comprising a second connector mateable with the first connector;
   wherein each of the power adapter and the wireless module is an independent device, and the power adapter and the wireless module can be detachably combined together through the first connector and the second connector;

wherein when the power adapter and the wireless module are combined together through the first connector and the second connector, the charging plug is capable of suppling power to the wireless module through the first connector and the second connector;

wherein the power adapter further comprises a third connector, the integrated device further comprises a power supply module, the power supply module comprises a fourth connector which is mateable with the third connector;

wherein the power supply module is an independent device, and the power adapter and the power supply module are capable of being detachably combined together through the third connector and the fourth connector; and wherein when the power adapter and the power supply module are combined together through the third connector and the fourth connector, the charging plug is capable of charging the power supply module through the third connector and the fourth connector.

10. The integrated device according to claim 9, wherein the power adapter and the wireless module are fixed by a magnetic coupling component, and the power adapter and the power supply module are fixed by another magnetic coupling component.

11. The integrated device according to claim 10, wherein the power supply module is a rechargeable battery.

12. The integrated device according to claim 9, wherein the third connector is a receptacle connector, the fourth connector is a plug connector, and the fourth connector is rotatably mounted to the power supply module.

13. The integrated device according to claim 9, wherein the power adapter is clamped between the wireless module and the power supply module.

14. The integrated device according to claim 13, wherein the power adapter has a cuboid shape, the wireless module defines a first receiving space, the power supply module defines a second receiving space, and the power adapter is received in the first receiving space and the second receiving space.

15. An integrated device, comprising:
a power adapter, the power adapter comprising a charging plug and a first connector; and
a wireless module, the wireless module comprising a second connector mateable with the first connector;
wherein each of the power adapter and the wireless module is an independent device, and the power adapter and the wireless module can be detachably combined together through the first connector and the second connector;
wherein when the power adapter and the wireless module are combined together through the first connector and the second connector, the charging plug is capable of suppling power to the wireless module through the first connector and the second connector; and
wherein the second connector is rotatably mounted to the wireless module; the second connector is rotatable between a closed position where the second connector is inserted into the first connector so that the wireless module is configured to be charged through the power adapter, and an open position where the second connector is connected to a power source so that the wireless module is configured to generate a wireless network.

16. The integrated device according to claim 15, wherein the second connector is a USB Type C plug connector.

17. The integrated device according to claim 15, wherein the wireless module comprises a first wall and a second wall perpendicular to the first wall, the second connector is provided on the first wall, and the second wall further defines a card slot for insertion of an electronic card.

18. The integrated device according to claim 15, wherein the power adapter further comprises a third connector, the integrated device further comprises a power supply module, the power supply module comprises a fourth connector which is mateable with the third connector;
wherein the power supply module is an independent device, and the power adapter and the power supply module are capable of being detachably combined together through the third connector and the fourth connector; and
wherein when the power adapter and the power supply module are combined together through the third connector and the fourth connector, the charging plug is capable of charging the power supply module through the third connector and the fourth connector.

19. The integrated device according to claim 18, wherein the power adapter is clamped between the wireless module and the power supply module.

20. The integrated device according to claim 19, wherein the power adapter has a cuboid shape, the wireless module defines a first receiving space, the power supply module defines a second receiving space, and the power adapter is received in the first receiving space and the second receiving space.

* * * * *